United States Patent
Mehrotra et al.

(10) Patent No.: US 12,452,834 B2
(45) Date of Patent: Oct. 21, 2025

(54) DISTRIBUTED PAGING OPTIMIZATION

(71) Applicant: Parallel Wireless, Inc., Nashua, NH (US)

(72) Inventors: Shivani Mehrotra, Nashua, NH (US); Mahendra Singh Rajput, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 444 days.

(21) Appl. No.: 17/822,129

(22) Filed: Aug. 24, 2022

(65) Prior Publication Data

US 2023/0072249 A1    Mar. 9, 2023

Related U.S. Application Data

(60) Provisional application No. 63/236,277, filed on Aug. 24, 2021.

(51) Int. Cl.
| | | |
|---|---|---|
| *H04W 52/02* | (2009.01) | |
| *H04W 68/00* | (2009.01) | |
| *H04W 68/02* | (2009.01) | |
| *H04W 68/12* | (2009.01) | |

(52) U.S. Cl.
CPC ................. *H04W 68/02* (2013.01)

(58) Field of Classification Search
CPC .. H04W 68/02; H04W 68/025; H04W 64/003
USPC ........................................................ 455/458
See application file for complete search history.

(56) References Cited

U.S. PATENT DOCUMENTS

| | | | |
|---|---|---|---|
| 2010/0075698 A1* | 3/2010 | Rune ..................... | H04W 68/08 455/458 |
| 2011/0096721 A1* | 4/2011 | Kamalaraj ........... | H04W 60/00 370/328 |
| 2011/0096731 A1* | 4/2011 | Kamalaraj ........... | H04W 48/18 370/329 |
| 2011/0286465 A1* | 11/2011 | Koodli ................. | H04W 68/00 370/401 |
| 2014/0024378 A1* | 1/2014 | Khude ................... | H04W 8/06 455/437 |
| 2014/0155109 A1* | 6/2014 | Vaidya ................. | H04W 68/04 455/458 |
| 2018/0007660 A1* | 1/2018 | Gao ..................... | H04W 68/02 |
| 2018/0368100 A1* | 12/2018 | Kasirajan .............. | H04W 8/02 |

(Continued)

OTHER PUBLICATIONS

IP.com search history (Year: 2025).*

(Continued)

*Primary Examiner* — Moustapha Diaby
(74) *Attorney, Agent, or Firm* — Michael Y. Saji

(57) ABSTRACT

A method is disclosed for providing distributed paging optimization, the method comprising: connecting a group of radio access network nodes, each supporting multiple small cells, to a gateway which acts as a virtual core network to the multiple small cells and acts as an eNodeB virtualizing the multiple small cells toward a core network; sending, by the gateway, in response to a paging request from the core network, a plurality of recommended cell IDs or base stations using a private information element (IE) in a paging request; and sending paging requests in response to the paging request from the core network to only the plurality of cell IDs or base stations recommended by the gateway.

14 Claims, 9 Drawing Sheets

(56) References Cited

U.S. PATENT DOCUMENTS

| | | | | |
|---|---|---|---|---|
| 2019/0357131 A1* | 11/2019 | Sivavakeesar | ........ | H04W 76/15 |
| 2020/0205121 A1* | 6/2020 | Yang | ..................... | H04W 68/02 |
| 2020/0229069 A1* | 7/2020 | Chun | .................... | H04W 76/30 |
| 2020/0351779 A1* | 11/2020 | Sharma | ................. | H04W 76/28 |
| 2021/0314915 A1 | 10/2021 | Kasirajan et al. | | |
| 2022/0095273 A1 | 3/2022 | Sangal et al. | | |

OTHER PUBLICATIONS

ProQuest search history (Year: 2025).*
LTE; Evolved Universal Terrestrial Radio Access Network (E-UTRAN); S1 Application Protocol (S1AP) (3GPP TS 36.413 version 15.3.0 Release 15), Sep. 2018.
Universal Mobile Telecommunications System (UMTS); LTE; 5G; Non-Access-Stratum (NAS) protocol for Evolved Packet System (EPS); Stage 3 (3GPP TS 24.301 version 15.4.0 Release 15), Oct. 2018.
LTE; General Packet Radio Service (GPRS) enhancements for Evolved Universal Terrestrial Radio Access Network (E-UTRAN) access (3GPP TS 23.401 version 12.6.0 Release 12), Sep. 2014.

* cited by examiner

DISTRIBUTED PAGING OPTIMIZATION

CROSS-REFERENCE TO RELATED APPLICATIONS

This application claims priority under 35 U.S.C. § 119(e) to U.S. Provisional Application No. 63/236,277, titled "Distributed Paging Optimization" and dated Aug. 24, 2021, which is also hereby incorporated by reference in its entirety. This application hereby incorporates by reference, for all purposes, each of the following U.S. patent application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety. Further details regarding some embodiments may be found in U.S. Pat. App. Publication Nos. US20200045565A1 and US20200042365A1, each of which are hereby incorporated by reference in their entirety for all purposes.

BACKGROUND

Paging is a mechanism to initiate services for UEs that are in idle mode. Idle mode transition is important to conserve battery of the UEs. If a UE is in connected mode and it has no data to send or receive, then the eNB waits for a specific timer (UE Inactivity Timer) and once that timer expires, the eNB sends the UE to idle mode.

To access the users in idle mode if there is downlink data for them, UE's identity is broadcast to the radio cells belonging to a group of tracking areas. UE could be present in one of those cells and responds to Paging by waking up and initiating the Service Request procedure.

SUMMARY

In a first embodiment, a method is disclosed for providing distributed paging optimization, the method comprising: connecting a group of radio access network nodes, each supporting multiple small cells, to a gateway which acts as a virtual core network to the multiple small cells and acts as an eNodeB virtualizing the multiple small cells toward a core network; sending, by the gateway, in response to a paging request from the core network, a plurality of recommended cell IDs or base stations using a private information element (IE) in a paging request; and sending paging requests in response to the paging request from the core network to only the plurality of cell IDs or base stations recommended by the gateway.

The method may further comprise sending, by the gateway, the plurality of recommended cell IDs using the private IE to a subset of the multiple small cells based on known user equipment (UE) activity information at the gateway. The method may further comprise identifying one of the group of radio access network nodes using last known location or heuristic information, and, sending a plurality of cell IDs hosted at the identified one of the group of radio access network nodes as the plurality of recommended cell IDs. The method may further comprise sending the plurality of cell IDs to a mobility management entity (MME) in a core network in a S1AP indication when the paging requests do not result in a user equipment (UE) being found. The method may further comprise sending, from the gateway, a list of X2 connected eNodeBs proximate to the gateway to a mobility management entity (MME) in the core network, and, sending, from the MME, a paging request to the list of X2 connected eNodeBs. The method may further comprise sending, from the gateway, a list of X2 connected eNodeBs matching a received tracking area identity (TAI) list to a mobility management entity (MME) in the core network, and, sending, from the MME, a paging request to the list of X2 connected eNodeBs. The radio access network nodes may be virtual baseband units (vBBUs) and the base stations may be eNodeBs.

In a second embodiment, a non-transitory computer-readable medium is disclosed, containing instructions for providing distributed paging optimization that, when executed, cause a system to perform steps comprising: connecting a group of radio access network nodes, each supporting multiple small cells, to a gateway which acts as a virtual core network to the multiple small cells and acts as an eNodeB virtualizing the multiple small cells toward a core network; sending, by the gateway, in response to a paging request from the core network, a plurality of recommended cell IDs or base stations using a private information element (IE) in a paging request; and sending paging requests in response to the paging request from the core network to only the plurality of cell IDs or base stations recommended by the gateway.

The instructions may further comprise sending, by the gateway, the plurality of recommended cell IDs using the private IE to a subset of the multiple small cells based on known user equipment (UE) activity information at the gateway. The instructions may further comprise identifying one of the group of radio access network nodes using last known location or heuristic information, and, sending a plurality of cell IDs hosted at the identified one of the group of radio access network nodes as the plurality of recommended cell IDs. The instructions may further comprise sending the plurality of cell IDs to a mobility management entity (MME) in a core network in a S1AP indication when the paging requests do not result in a user equipment (UE) being found. The instructions may further comprise sending, from the gateway, a list of X2 connected eNodeBs proximate to the gateway to a mobility management entity (MME) in the core network, and, sending, from the MME, a paging request to the list of X2 connected eNodeBs. The instructions may further comprise sending, from the gateway, a list of X2 connected eNodeBs matching a received tracking area identity (TAI) list to a mobility management entity (MME) in the core network, and, sending, from the MME, a paging request to the list of X2 connected eNodeBs. The radio access network nodes may be virtual baseband units (vB-BUs) and the base stations may be eNodeBs.

DETAILED DESCRIPTION

Figure 1:
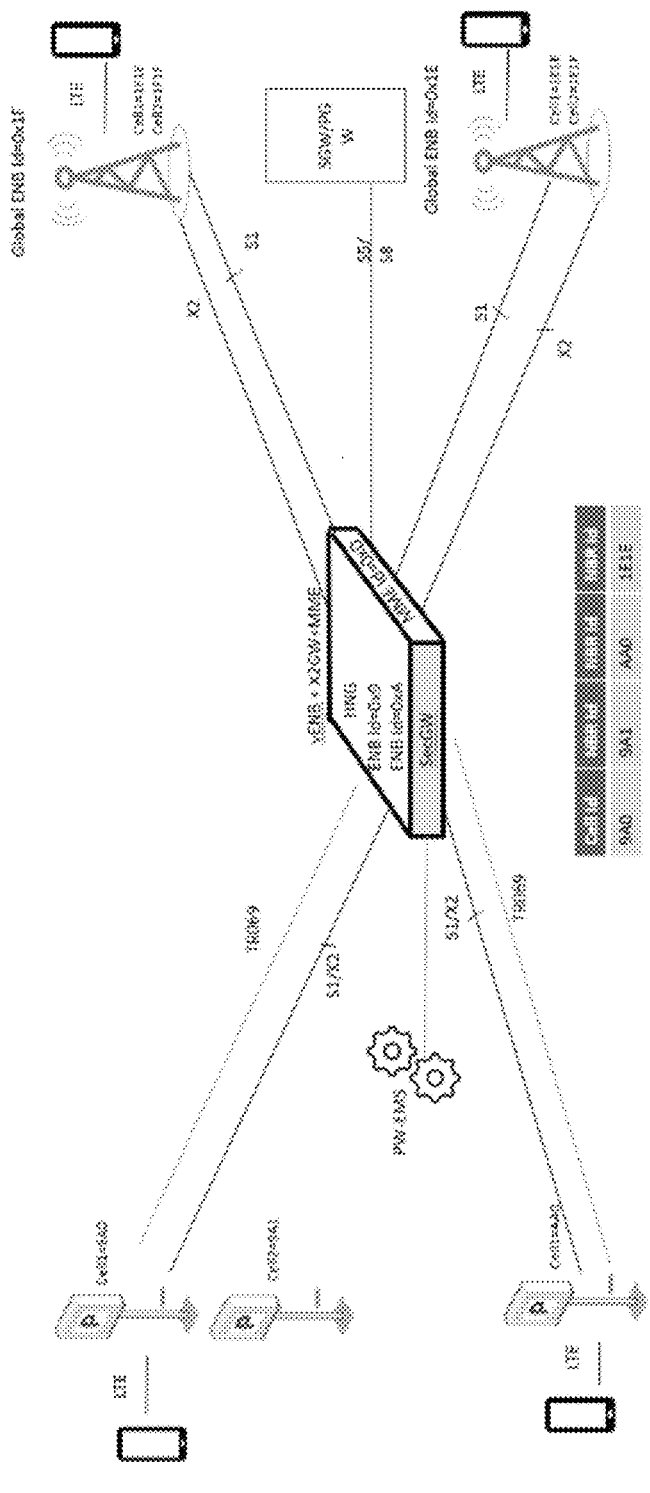
FIG. 1 is a schematic diagram of a gateway in a radio access network, in accordance with some embodiments.

FIG. 1 is a schematic diagram 100 of a gateway in an LTE radio access network, in accordance with some embodiments.

Two vBBUs are shown, with a first vBBU supporting two cells and a second vBBU supporting one cell. Both vBBUs are managed by the gateway shown in the center of the figure, where each vBBU is mapped to a single eNodeB ID at the gateway towards the core network (shown as SGW/PGW). The vBBUs may support more than one base station and this is virtualized towards the core network using the mapping. Two base stations are also shown that are global eNodeBs and have global eNodeB IDs. These are connected via X2 to the gateway and their cell IDs are known to the gateway.

This solution is devised for an architecture wherein a group of vBBUs supporting multiple small cells are connected to a virtual eNodeB (herein identified as an HNG) which is virtual at least insofar as it acts as Core network to these cells and acts as eNodeB virtualizing all these cells towards core network.

This approach uses the flexibility of the proprietary solutions supporting vBBU, virtual eNodeBs, X2GW and MME nodes to device a solution to minimize the control traffic as well as optimize radio resources.

This feature empowers the solution to give better performance and make optimal use of network and radio resources.

In some embodiments, a private IE is added to the standard Paging Request. A new S1AP indication REROUTE-PAGING-INDICATION is also added to inform MME about a list of possible eNodeBs which can be targeted for paging.

A system is disclosed to enhance LTE eNB, vBBU and MME nodes in a manner which would optimize the transmissions of paging messages in such an architecture, as well as in analogous or equivalent architectures in 5G or other Gs.

Several paging optimizations have already been considered based on the last known location of the cell or heuristics based on the earlier architecture where each base station served only one cell.

However, HNG will not be able to identify the exact cell location in the multi-cell architecture when each vBBU may be hosting multiple cells itself.

HNG will be able to identify vBBU based on last known location or heuristic information of a particular cell but vBBU needs to send this request to all the cells which would result in consumption of lot of radio resources.

By allowing each HNG to identify a vBBU (or set of cells or set of vBBUs or set of macros) independently, the present disclosure allows for distributed paging. Further, the disclosed method reduces the number of cells that need to be paged and thereby provides a significant optimization.

Figure 2:
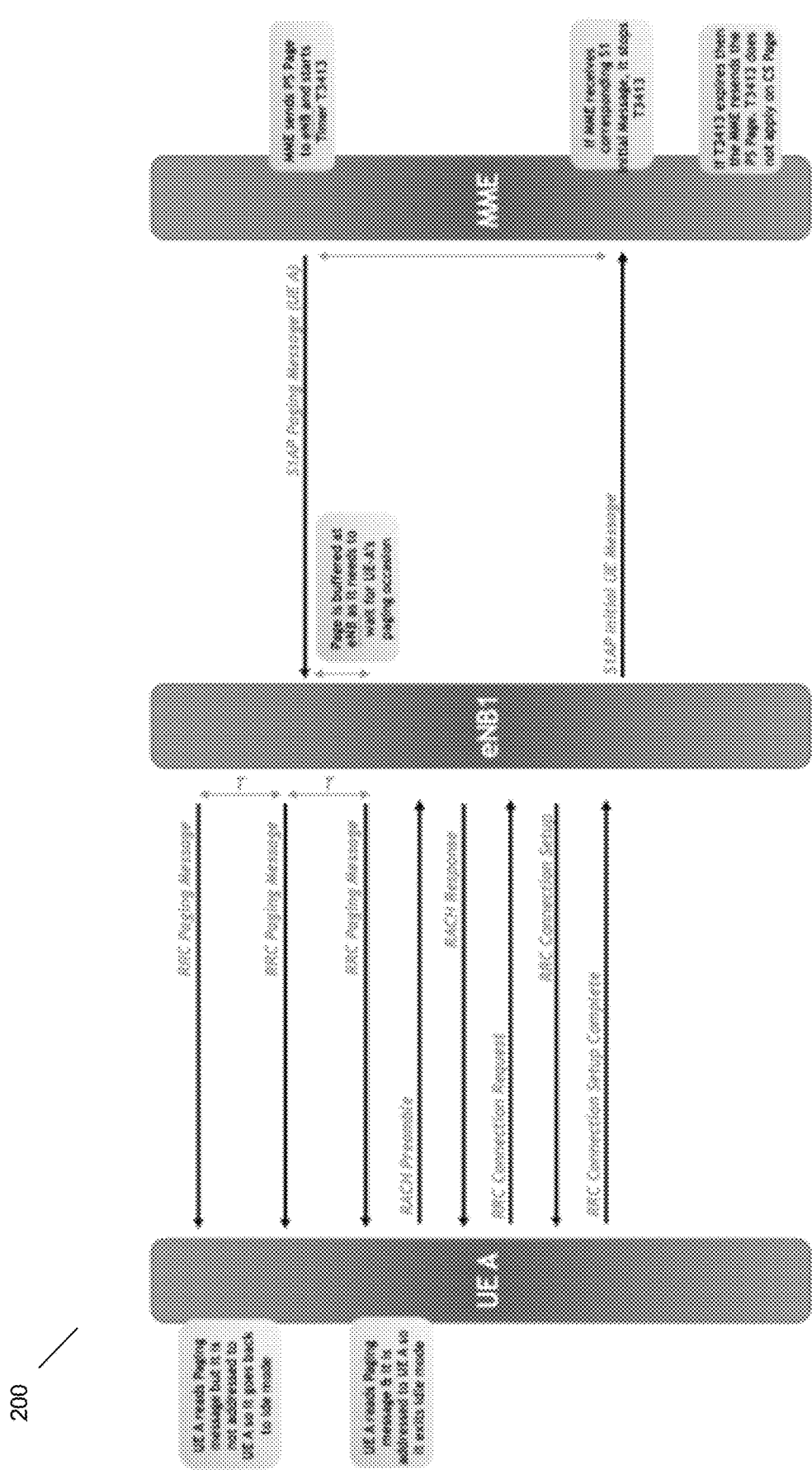
FIG. 2 is a schematic diagram of a message flow, in accordance with some embodiments.

FIG. 2 is a schematic diagram of a message flow 200, in accordance with some embodiments. The message flow is shown from right to left. The paging message originates at MME, then goes to eNB1, and then goes to UE A. Once UE A receives an appropriate paging message it exits idle mode and sets up an RRC connection; however, paging is very expensive especially when it does not reach the UE quickly.

Figure 3:
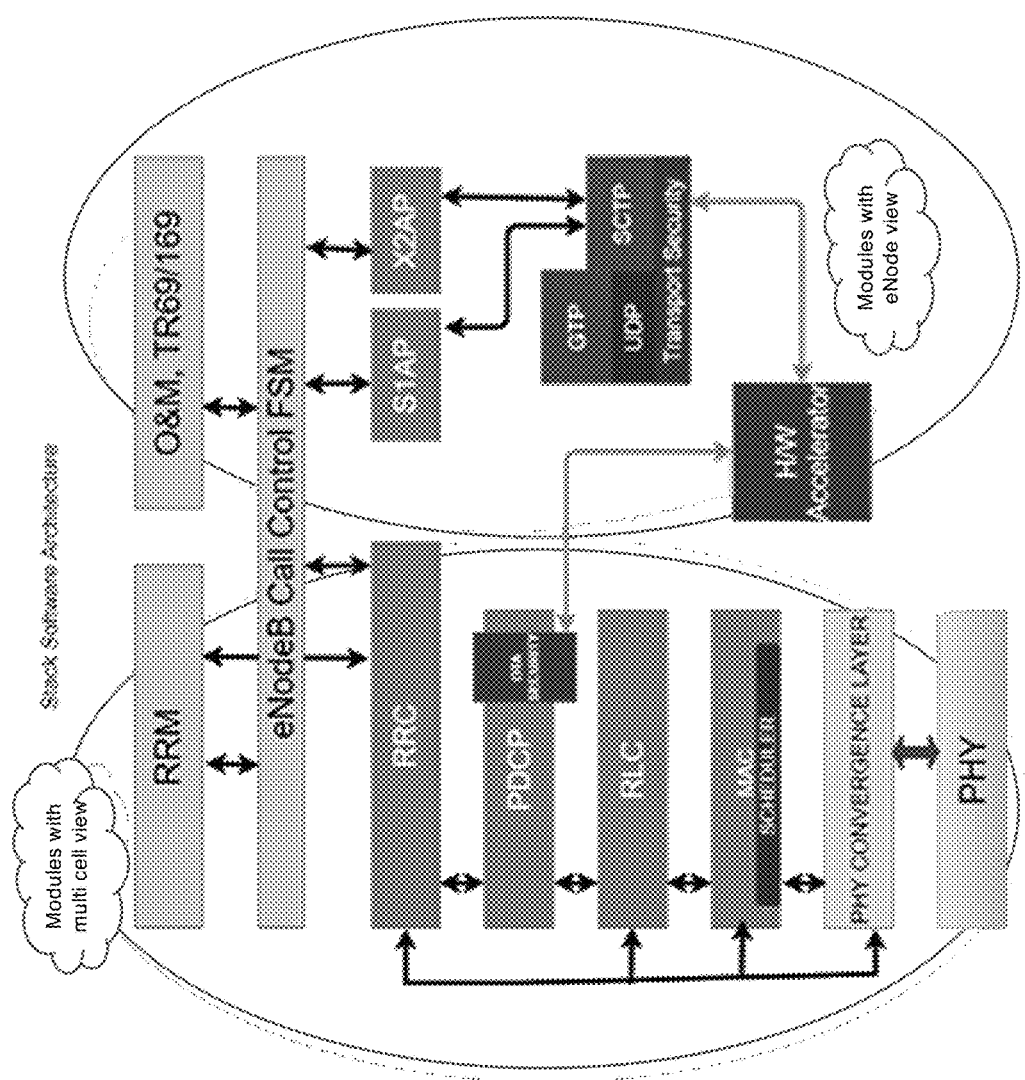
FIG. 3 is a schematic diagram of a radio access network (RAN) software stack architecture, in accordance with some embodiments.

FIG. 3 is a schematic diagram of a radio access network (RAN) software stack architecture 300, in accordance with some embodiments.

Figure 4:
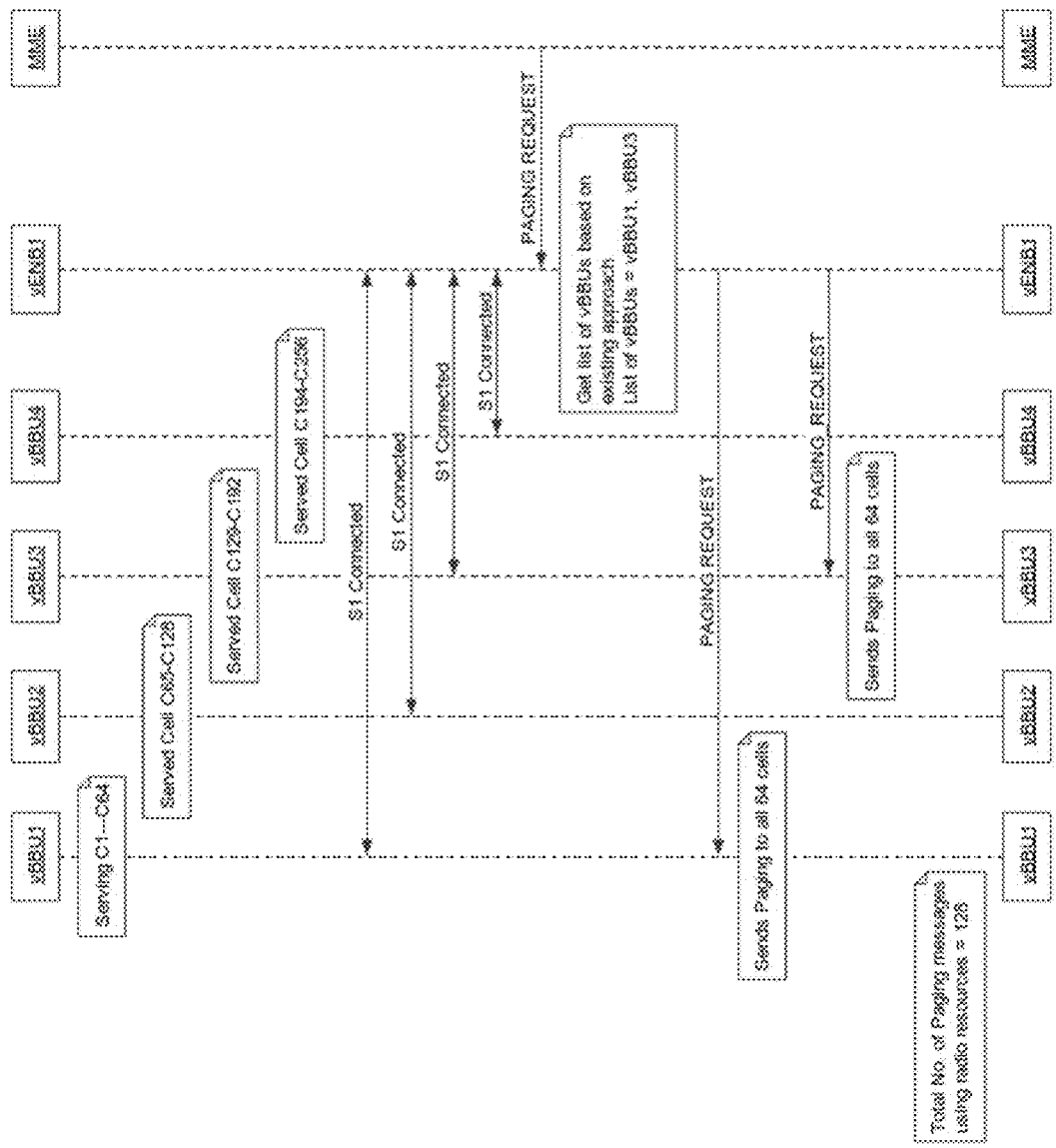
FIG. 4 is a call flow diagram showing paging, in accordance with some embodiments.

FIG. 4 is a call flow diagram showing paging 400 in the present architecture showing 4 vBBUs on an HNG, in accordance with some embodiments.

Considering each node can support up to 64 cells, each Paging message directed towards this node would be sent to all 64 cells, hence resulting in increased processing time and radio resource usage.

Figure 5:
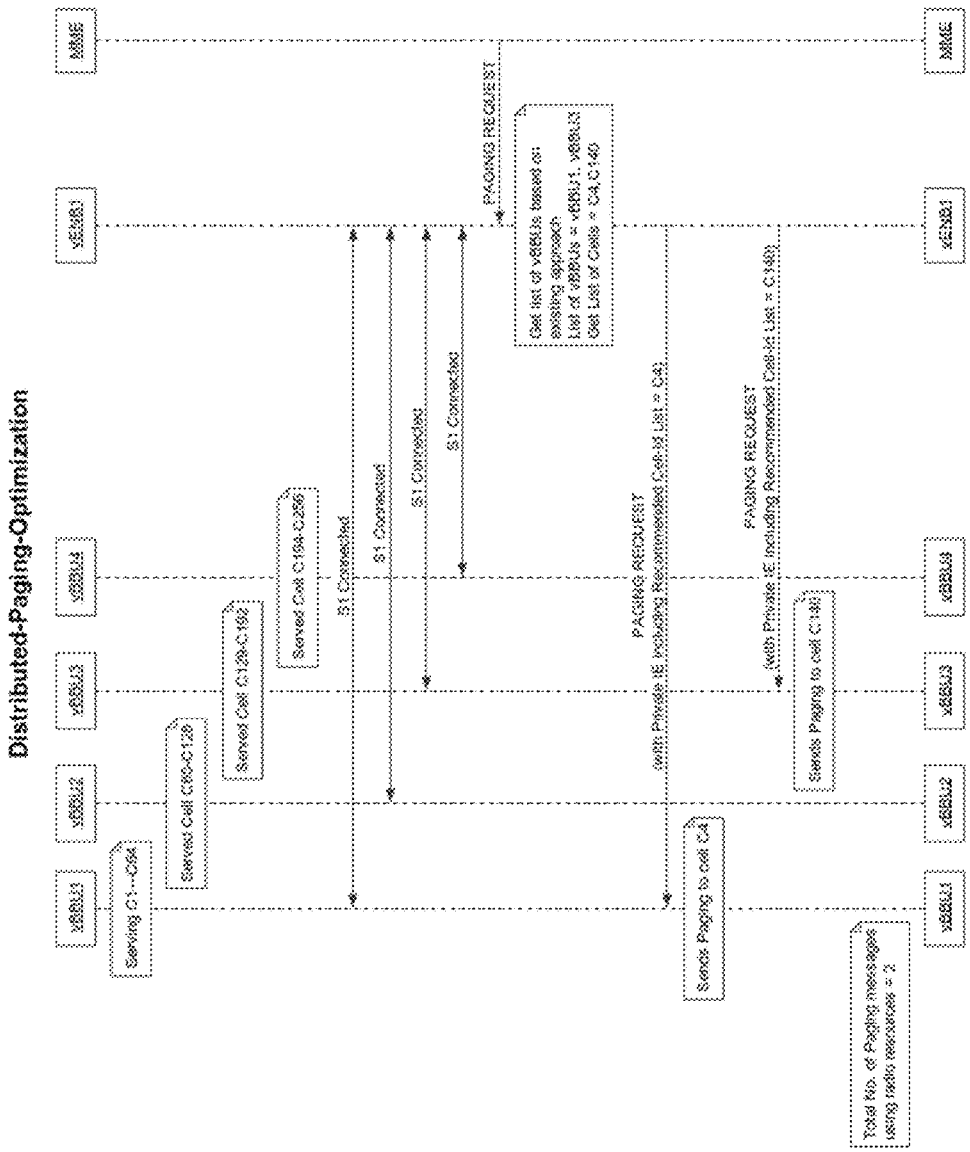
FIG. 5 is a call flow diagram showing distributed paging, in accordance with some embodiments.

FIG. 5 is a call flow diagram showing distributed paging, in accordance with some embodiments.

The idea presented in this document defines an approach to optimize paging by enabling HNG to send the list of recommended Cell Ids derived by using the existing optimizations to vBBU nodes by using the Private IE in Paging Request.

vBBU then can make use of this information to send Paging request to only cell-ids suggested by HNG. This would significantly reduce the processing time as well as radio resources being used corresponding to request being sent to each cell. Only 2 paging messages are required to be sent and not 64.

A heuristic or flow or process is used at the HNG to determine the recommended list (not disclosed specifically herein). Any algorithm therefor could be used.

Paging is further optimized by enabling HNG to send the Recommended List of Third party eNodeBs to MME in case UE is not found.

VeNB shall maintain the list of X2 connected Macros (other eNBs) and use this information to send REROUTE-PAGING-INDICATION to MME if Macros are serving the TAI List (tracking area identity list) arrived in the paging.

This will further optimize the network signaling as MME can Page the recommended eNodeBs instead of broadcasting the request.

The format of the indication is explained below.

Reroute Paging Indication

This message is sent by the eNB and is used to indicate MME to send paging indication towards a specific eNodeB over the S1 interface.

Direction: eNB→MME

TABLE 1

| IE/Group Name | Presence | IE Type | Criticality Assigned | Criticality |
|---|---|---|---|---|
| Message Type | M | 9.2.1.1 | YES | ignore |
| UE Paging Identity | M | 9.2.3.13 | YES | ignore |
| List of Recommended eNBs for Paging | M | 9.2.1.107 | YES | ignore |

IE type in the above table refers to corresponding Sections as defined in 3GPP 36.413, hereby incorporated by reference in its entirety. Any similar mapping or table could be used if conceptually similar. An IE having a different name but with the same information would be equivalent to the presented disclosure.

Any desired UE identity could be used, in some embodiments, such as IMSI, TMSI, etc. Criticality is set to ignore to enable network nodes that do not process this special IE to ignore the message.

On receiving REROUTE-PAGING-INDICATION, MME first sends the Paging Request to the recommended eNodeBs before broadcasting the request.

Since HNG recommends eNodeBs based on the neighbor information maintained at X2 link, there is good probability that UE might have moved to the suggested eNodeBs.

Figure 6:
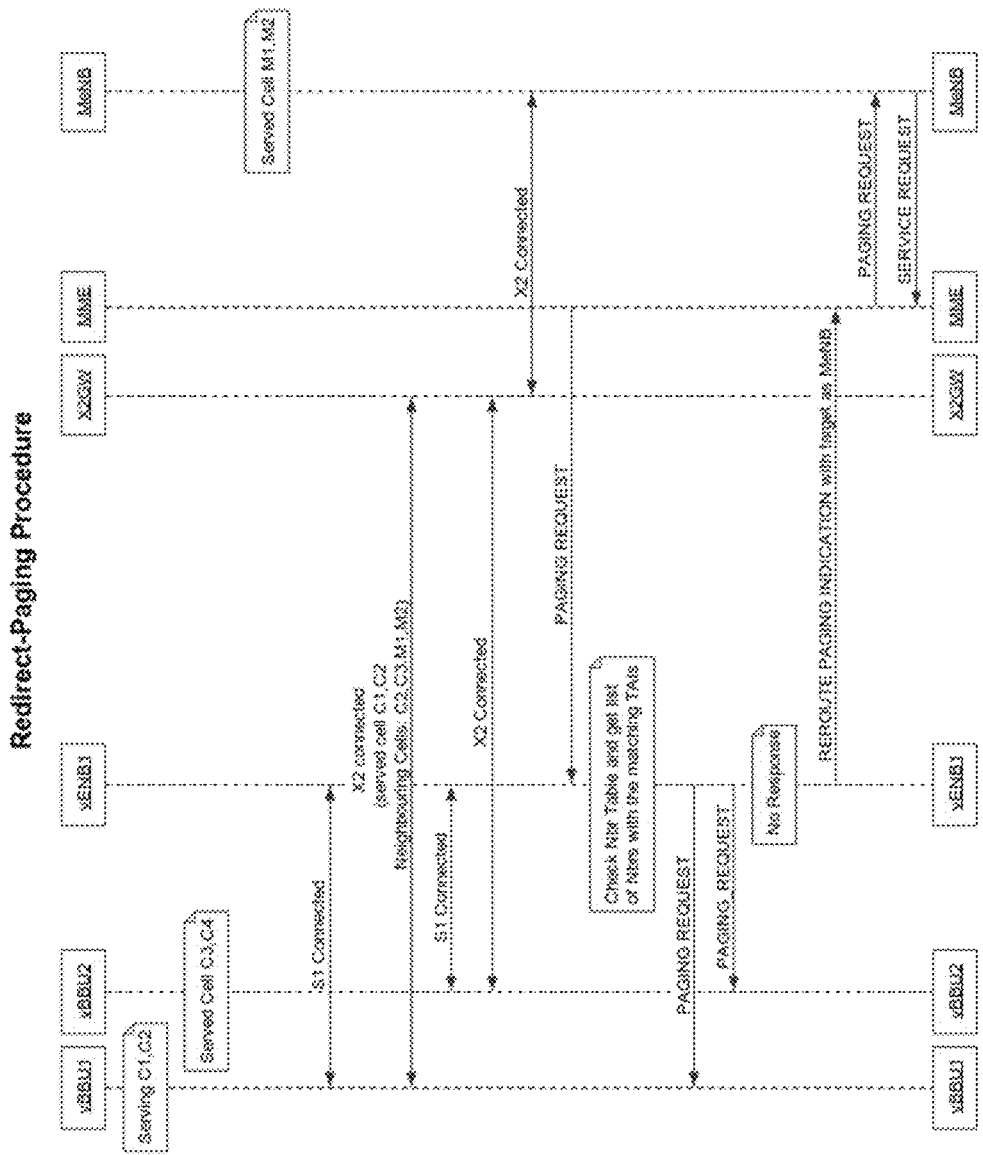
FIG. 6 is a call flow diagram showing redirect paging, in accordance with some embodiments.

FIG. 6 is a call flow diagram showing redirect paging, in accordance with some embodiments.

This approach will save on significant L5, L4, L3 and L2 processing for the S1AP Paging messages that are sent thus eliminating most part of the stack processing for those messages. It will also decrease load on the MME which is the most critical and loaded node thus increasing the overall system performance.

Figure 7:
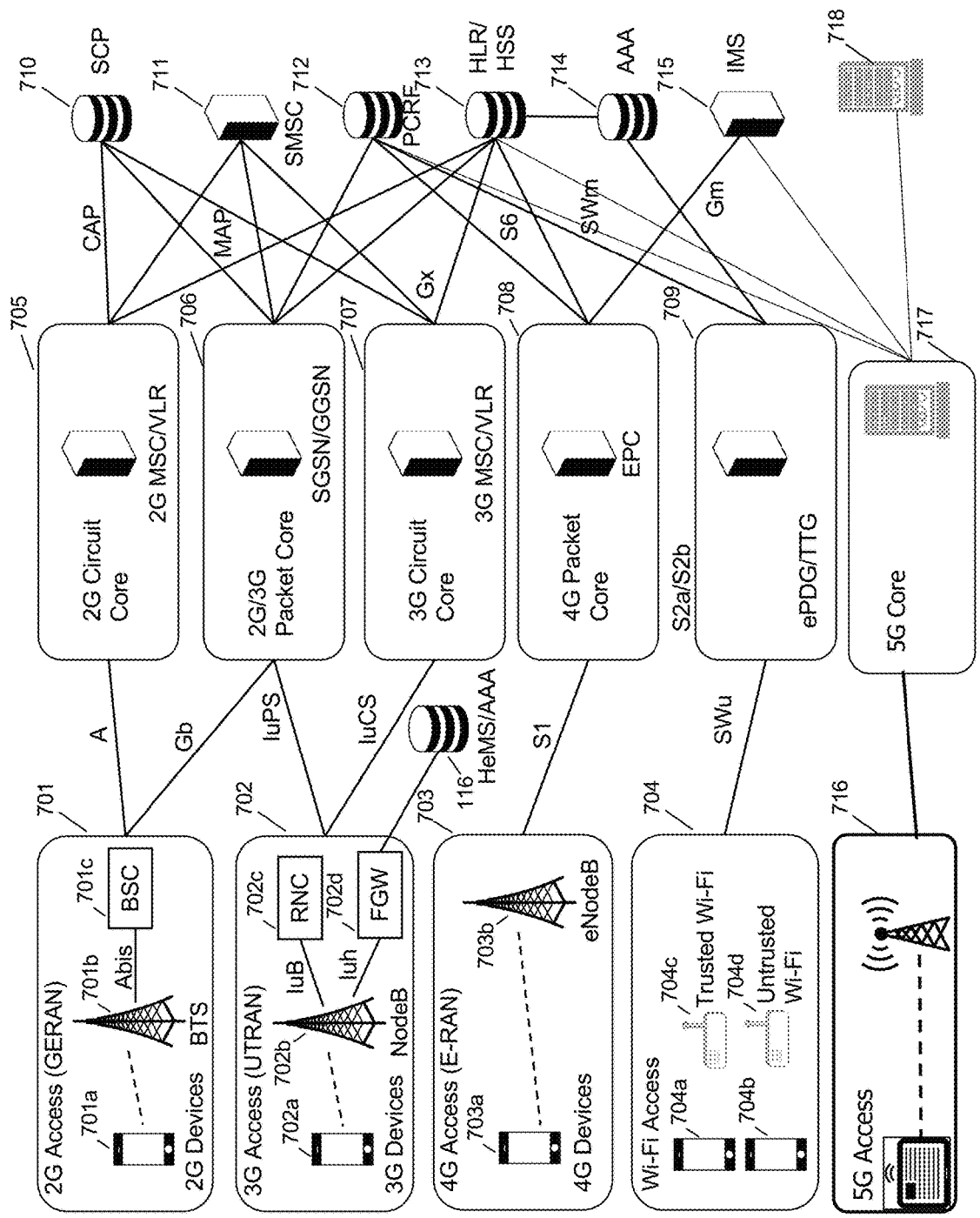
FIG. 7 shows a schematic network architecture diagram for 4G and other-G networks, in accordance with some embodiments.

FIG. 7 shows a schematic network architecture diagram for 4G and other-G prior art networks. The diagram shows a plurality of "Gs," including 2G, 3G, 4G, 5G and Wi-Fi. 2G is represented by GERAN 701, which includes a 2G device 701a, BTS 701b, and BSC 701c. 3G is represented by UTRAN 702, which includes a 3G UE 702a, nodeB 702b, RNC 702c, and femto gateway (FGW, which in 3GPP namespace is also known as a Home nodeB Gateway or HNBGW) 702d. 4G is represented by EUTRAN or E-RAN 703, which includes an LTE UE 703a and LTE eNodeB 703b. Wi-Fi is represented by Wi-Fi access network 704, which includes a trusted Wi-Fi access point 704c and an untrusted Wi-Fi access point 704d. The Wi-Fi devices 704a and 704b may access either AP 704c or 704d. In the current network architecture, each "G" has a core network. 2G circuit core network 705 includes a 2G MSC/VLR; 2G/3G packet core network 706 includes an SGSN/GGSN (for EDGE or UMTS packet traffic); 3G circuit core 707 includes a 3G MSC/VLR; 4G circuit core 708 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 730, the SMSC 731, PCRF 732, HLR/HSS 733, Authentication, Authorization, and Accounting server (AAA) 734, and IP Multimedia Subsystem (IMS) 735. An HeMS/AAA 736 is present in some cases for use by the 3G UTRAN. The diagram is used to indicate schematically the basic functions of each network as known to one of skill in the art, and is not intended to be exhaustive. For example, 5G core 717 is shown using a single interface to 5G access 716, although in some cases 5G access can be supported using dual connectivity or via a non-standalone deployment architecture.

Noteworthy is that the RANs 701, 702, 703, 704 and 736 rely on specialized core networks 705, 706, 707, 708, 709, 737 but share essential management databases 730, 731, 732, 733, 734, 735, 738. More specifically, for the 2G GERAN, a BSC 701c is used for Abis compatibility with BTS 701b, while for the 3G UTRAN, an RNC 702c is used for Iub compatibility and an FGW 702d is used for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. The present invention is also applicable for 5G networks since the same or equivalent functions are available in 5G. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 8:
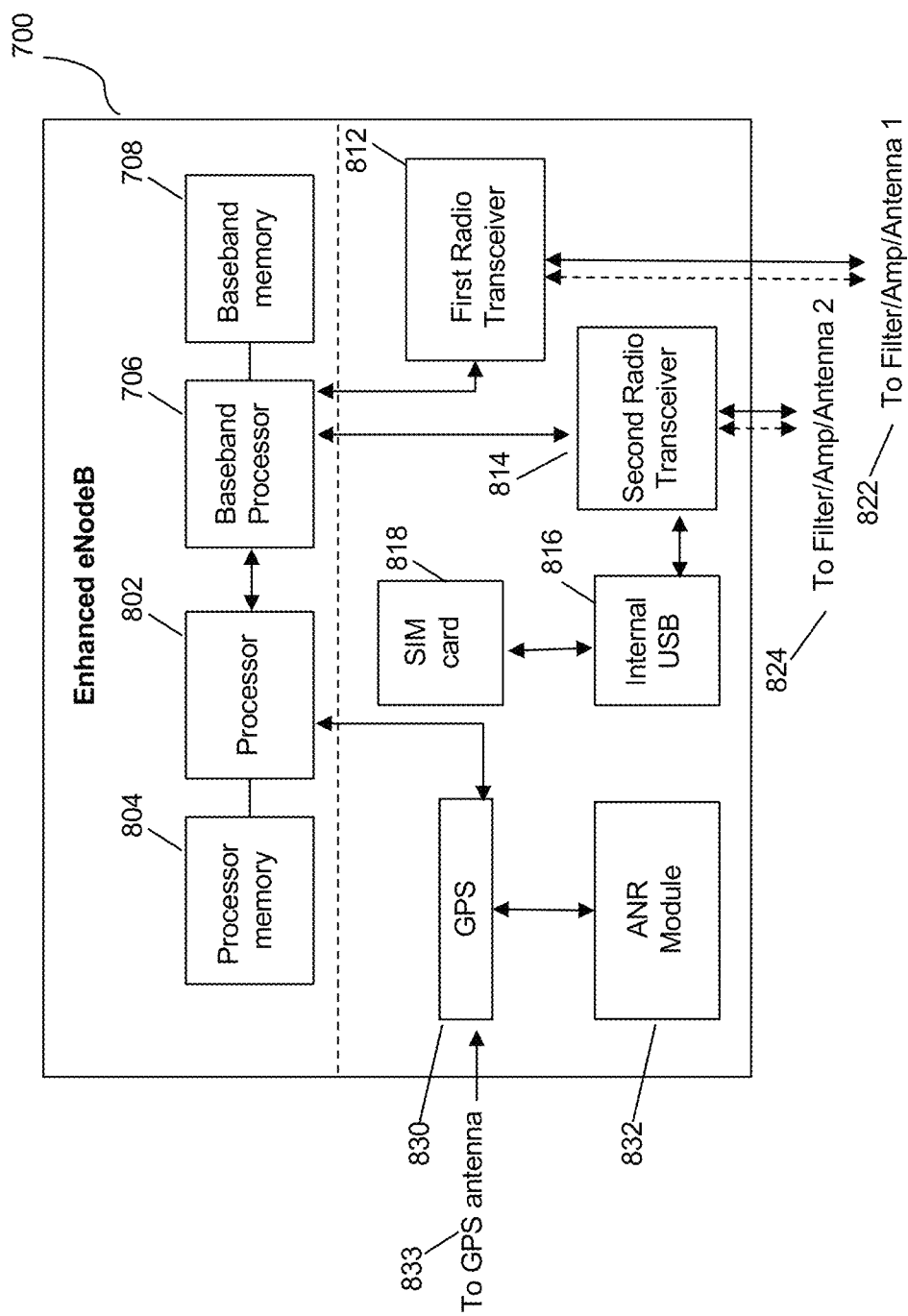
FIG. 8 is an enhanced eNodeB for performing the methods described herein, in accordance with some embodiments.

FIG. 8 shows an enhanced eNodeB for performing the methods described herein, in accordance with some embodiments. eNodeB 800 may include processor 802, processor memory 804 in communication with the processor, baseband processor 806, and baseband processor memory 808 in communication with the baseband processor. Mesh network node 800 may also include first radio transceiver 812 and second radio transceiver 814, internal universal serial bus (USB) port 816, and subscriber information module card (SIM card) 818 coupled to USB port 816. In some embodiments, the second radio transceiver 814 itself may be coupled to USB port 816, and communications from the baseband processor may be passed through USB port 816. The second radio transceiver may be used for wirelessly backhauling eNodeB 800.

Processor 802 and baseband processor 806 are in communication with one another. Processor 802 may perform routing functions, and may determine if/when a switch in network configuration is needed. Baseband processor 806 may generate and receive radio signals for both radio transceivers 812 and 814, based on instructions from processor 802. In some embodiments, processors 802 and 806 may be on the same physical logic board. In other embodiments, they may be on separate logic boards.

Processor 802 may identify the appropriate network configuration, and may perform routing of packets from one network interface to another accordingly. Processor 802 may use memory 804, in particular to store a routing table to be used for routing packets. Baseband processor 806 may perform operations to generate the radio frequency signals for transmission or retransmission by both transceivers 810 and 812. Baseband processor 806 may also perform operations to decode signals received by transceivers 812 and 814. Baseband processor 806 may use memory 808 to perform these tasks.

The first radio transceiver 812 may be a radio transceiver capable of providing LTE eNodeB functionality, and may be capable of higher power and multi-channel OFDMA. The second radio transceiver 814 may be a radio transceiver capable of providing LTE UE functionality. Both transceivers 812 and 814 may be capable of receiving and transmitting on one or more LTE bands. In some embodiments, either or both of transceivers 812 and 814 may be capable of providing both LTE eNodeB and LTE UE functionality. Transceiver 812 may be coupled to processor 802 via a Peripheral Component Interconnect-Express (PCI-E) bus, and/or via a daughtercard. As transceiver 814 is for providing LTE UE functionality, in effect emulating a user equipment, it may be connected via the same or different PCI-E bus, or by a USB bus, and may also be coupled to SIM card 818. First transceiver 812 may be coupled to first radio frequency (RF) chain (filter, amplifier, antenna) 822, and second transceiver 814 may be coupled to second RF chain (filter, amplifier, antenna) 824.

SIM card 818 may provide information used for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 812 and 814, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 830 may also be included, and may be in communication with a GPS antenna 832 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 832 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 9:
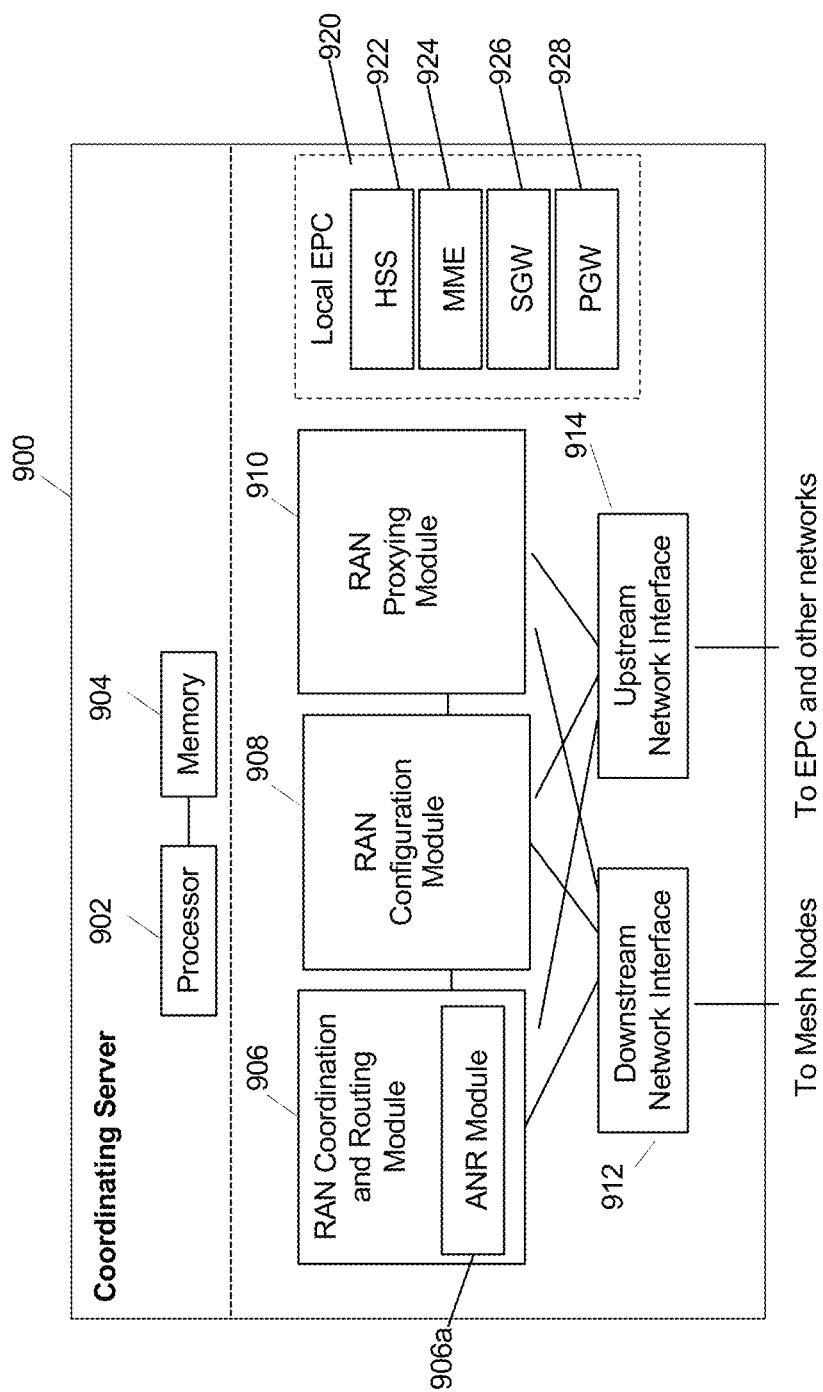
FIG. 9 is a coordinating server for providing services and performing methods as described herein, in accordance with some embodiments.

FIG. 9 shows a coordinating server for providing services and performing methods as described herein, in accordance with some embodiments. Coordinator 900 includes processor 902 and memory 904, which are configured to provide the functions described herein. Also present are radio access network coordination/routing (RAN Coordination and routing) module 906, including ANR module 906a, RAN configuration module 908, and RAN proxying module 910. The ANR module 906a may perform the ANR tracking, PCI disambiguation, ECGI requesting, and GPS coalescing and tracking as described herein, in coordination with RAN coordination module 906 (e.g., for requesting ECGIs, etc.). In some embodiments, coordinating server 900 may coordinate multiple RANs using coordination module 906. In some embodiments, coordination server may also provide proxying, routing virtualization and RAN virtualization, via modules 910 and 908. In some embodiments, a downstream network interface 912 is provided for interfacing with the RANs, which may be a radio interface (e.g., LTE), and an upstream network interface 914 is provided for interfacing with the core network, which may be either a radio interface (e.g., LTE) or a wired interface (e.g., Ethernet).

Coordinator 900 includes local evolved packet core (EPC) module 920, for authenticating users, storing and caching priority profile information, and performing other EPC-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Modules 906, 908, 910 and local EPC 920 may each run on processor 902 or on another processor, or may be located within another device.

Coordinator 900 may also include one or more of the components shown in the software stack architecture of FIG. 3, in some embodiments. Coordinator 900 may also provide one or more of the functionalities or modules described herein using containers, such as Docker containers, Linux containers, or other virtualization technologies. Coordinator 900 may provide functionalities such as failover, restart, failure detection, service routing, self-healing, rollout, replication, and other functionalities using an orchestration platform such as Kubernetes. Containers or functionalities may be provided on the same physical machine or on two or more distinct physical machines, in some embodiments. The present disclosure may be deployed using containerized technologies, in some embodiments. Different aspects of coordinator 900 may be provided using different containers and they may be represented as a single logical machine, in some embodiments.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing distributed paging optimization, the method comprising:
   connecting a group of radio access network nodes, each supporting multiple small cells, to a gateway which acts as a virtual core network to the multiple small cells and acts as an eNodeB virtualizing the multiple small cells toward a core network;
   sending, by the gateway, in response to a paging request from the core network, a plurality of recommended cell IDs or base stations using a private information element (IE) in a paging request; and
   sending paging requests in response to the paging request from the core network to only the plurality of cell IDs or base stations recommended by the gateway.

2. The method of claim 1, further comprising sending, by the gateway, the plurality of recommended cell IDs using the private IE to a subset of the multiple small cells based on known user equipment (UE) activity information at the gateway.

3. The method of claim 1, further comprising identifying one of the group of radio access network nodes using last known location or heuristic information, and, sending a plurality of cell IDs hosted at the identified one of the group of radio access network nodes as the plurality of recommended cell IDs.

4. The method of claim 1, further comprising sending the plurality of cell IDs to a mobility management entity (MME) in a core network in a S1AP indication when the paging requests do not result in a user equipment (UE) being found.

5. The method of claim 1, further comprising sending, from the gateway, a list of X2 connected eNodeBs proximate to the gateway to a mobility management entity (MME) in the core network, and, sending, from the MME, a paging request to the list of X2 connected eNodeBs.

6. The method of claim 1, further comprising sending, from the gateway, a list of X2 connected eNodeBs matching a received tracking area identity (TAI) list to a mobility management entity (MME) in the core network, and, sending, from the MME, a paging request to the list of X2 connected eNodeBs.

7. The method of claim 1, wherein the radio access network nodes are virtual baseband units (vBBUs) and the base stations are eNodeBs.

8. A non-transitory computer-readable medium containing instructions for providing distributed paging optimization that, when executed, cause a system to perform steps comprising:
   connecting a group of radio access network nodes, each supporting multiple small cells, to a gateway which acts as a virtual core network to the multiple small cells and acts as an eNodeB virtualizing the multiple small cells toward a core network;
   sending, by the gateway, in response to a paging request from the core network, a plurality of recommended cell IDs or base stations using a private information element (IE) in a paging request; and
sending paging requests in response to the paging request from the core network to only the plurality of cell IDs or base stations recommended by the gateway.

9. The non-transitory computer-readable medium of claim 8, the instructions further comprising sending, by the gateway, the plurality of recommended cell IDs using the private IE to a subset of the multiple small cells based on known user equipment (UE) activity information at the gateway.

10. The non-transitory computer-readable medium of claim 8, the instructions further comprising identifying one of the group of radio access network nodes using last known location or heuristic information, and, sending a plurality of cell IDs hosted at the identified one of the group of radio access network nodes as the plurality of recommended cell IDs.

11. The non-transitory computer-readable medium of claim 8, the instructions further comprising sending the plurality of cell IDs to a mobility management entity (MME) in a core network in a S1AP indication when the paging requests do not result in a user equipment (UE) being found.

12. The non-transitory computer-readable medium of claim 8, the instructions further comprising sending, from the gateway, a list of X2 connected eNodeBs proximate to the gateway to a mobility management entity (MME) in the core network, and, sending, from the MME, a paging request to the list of X2 connected eNodeBs.

13. The non-transitory computer-readable medium of claim 8, the instructions further comprising sending, from the gateway, a list of X2 connected eNodeBs matching a received tracking area identity (TAI) list to a mobility management entity (MME) in the core network, and, sending, from the MME, a paging request to the list of X2 connected eNodeBs.

14. The non-transitory computer-readable medium of claim 8, wherein the radio access network nodes are virtual baseband units (vBBUs) and the base stations are eNodeBs.

* * * * *